Patented Aug. 17, 1926.

1,596,232

UNITED STATES PATENT OFFICE.

JAMES EDGAR BLACK, OF KANSAS CITY, MISSOURI, ASSIGNOR TO BITUMENIZED ROAD COMPANY, OF KANSAS CITY, MISSOURI, A CORPORATION OF ARIZONA.

SURFACING MATERIAL AND PROCESS OF MAKING THE SAME.

No Drawing.  Application filed May 8, 1925.  Serial No. 28,976.

This invention relates to improvements in a waterproof surfacing material and a process of making the same, and refers more particularly to a material made from an intimate combination of a waterproof binder with ordinary soil such as clay and loam as distinguished from crushed stone, gravel, sand or rubble such as is commonly used in preparing road or surfacing materials.

This invention is an improvement of the invention described in a prior patent to Michael A. Popkess, No. 1,008,433, dated November 14th, 1911.

The improvement, over the invention described in this prior patent, lies primarily in the method of preparing the ingredients and the selection of ingredients to eliminate certain objectionable materials heretofore not recognized as elements which would produce and develop faults or defects in the finished product.

The incorporation of the waterproofing material, into the soil or disintegrated earth, is effected by first pulverizing the earthy material to a finely divided or discrete form in a machine. The desired degree of fineness may be appreciated by typical example of the material which has been used for this purpose. Earthy material reduced to a state in which 70% or more passed a 200 mesh screen has been found to be of satisfactory fineness. While 70% or more of the above material passes the 200 mesh screen, 52% passes a 300 mesh screen, 87.9% passes a 100 mesh screen, and all passes a 10 mesh screen. From this, it may be readily appreciated that the earthy material is brought to a degree of fineness comparable to flour or very fine dust. In some cases, however, it is not necessary nor desirable to attain the degree of fineness shown by the above.

In making the mixture, the earthy material is first placed in a rotary drier, which is inclined at a suitable angle, and is fired internally so that this earthy material is discharged from the drier at a temperature of 400° F. or higher. Material heated so that the final pulverized product having a loss on ignition of less than 5% has proved satisfactory. It works its way from one end of the drier to the other, due to its inclination, and is discharged into a pulverizer where it is disintegrated to a dry dust having characteristics as to fineness such as those above described. It is then screened to remove any larger particles which may remain and is elevated into a bin from which it is discharged into a pug mill. In the meantime, it has cooled ordinarily from 50° to 200° F. due to radiation. In this mill or mixer is supplied from 14% to 25% of water proofing bituminous substance such as asphalt. This asphalt is heated to a temperature at which it is readily incorporated and may be thoroughly mixed with the fine particles of earthy material to which it is added. This mix takes place at temperatures of from 300° F. to 400° F., care being taken that the temperature is not such that the ashphalt will be burned or oxidized. The mixture is removed from the pug mill at temperatures ranging from 300° F. to 375° F., although material discharged at temperatures of from 250° F. to 400° F. is not rejected. The mixture is then in a condition to be applied to a pavement or for surfacing where a tough wear-resistant surface is desired, and the mixture is rolled to a density of at least 1.90 or greater.

A distinct advantage of combining an earth with a bituminous binder, such as explained, is the fact that asphalt combined in this manner does not fuse and will not flow with the application of heat, but retains its form although temperatures above that of the melting point of the bitumen be applied. Such a mixture further permits of the use of a wide variety of asphalts with relation to melting temperatures and penetration. Asphalts having a penetration of 50 to 150 have been satisfactorily incorporated and used for this purpose.

The function of the preliminary heat applied in the rotary drier is not only to dry the surface of the minute particles in order that the waterproofing binder will satisfactorily adhere thereto, but to largely eliminate therefrom the water of hydration. Heretofore, it has been thought sufficient to dry the dust particles at temperatures up to 300° F. at which temperatures it was thought that moisture was satisfactorily eliminated from earthy material. Practice and experience have shown, however, that the presence of the water of hydration contained in the earthy material is objectionable and unless such water is not largely eliminated, the condition becomes aggravated when the surfacing material is subjected to weathering conditions. The degree of heat essential for the production of a satisfactory dehydrated earthy material inert to subsequent moisture effects is that degree of heat subjected to the earthy material which will render it more readily absolvent to bitumen. Such temperatures range from 400 upward,—higher temperatures being limited only by the fact that the subsequent mixture with the asphalt must not scorch or burn the asphalt during their combination. Under certain conditions, or with certain types of soil, a certain amount of cooling may be required between the drying operation and the mixing operation in order that objectionable temperatures may be eliminated. Under such conditions where a cooling action is resorted to between the drying and mixing stages, much higher temperatures may be used in the drying or dehydrating stage.

Another factor which has an intimate relation to the presence of moisture in the earthy material or its tendency to hydrate is the presence of alkalies in the earthy substance. It has been found in actual practice that the earth used must be practically free from alkalies or other water soluble salts, and a restriction of the amount of such materials present to produce a proper and satisfactory mix has been set at substantially one-half of one percent. Water soluble materials of this character, having a tendency to hydrate or dissolve in water, have a decidedly deteriorating effect upon the mixture if they are present in any considerable quantities in the earthy substance. When the earthy material is not substantially free from water soluble substances, then it may be necessary or advisable to remove water soluble substances by elutriation. An ordinarily available material admirably adapted to this purpose is the sediment from settling basins or filtration beds of municipal water works.

When properly pulverized and dried and the water removed and substantially free from water soluble substances and after the asphalt or bituminous waterproofing material has been incorporated thoroughly into the earth to produce a smooth mixture, the produce is smooth and malleable, producing a firm, compact, unitary mass when compressed or rolled. The amount of asphalt present will vary according to the materials used, but it is essential that sufficient bitumen be incorporated into the mix to make it waterproof, as the moisture has been found to be the principal factor which promotes disintegration of the surfacing material.

According to the prior patent mentioned, it was appreciated that one of the elements involved in procuring a satisfactory combination was a drying operation, but since it has been discovered that something more than a mere drying of the earthy material is necessary and also that there must be a rather careful selection of the earthy material to have present only a certain percentage of water soluble material. To secure a mix which gives satisfaction according to present day road requirements, and one which has wearing qualities considerably better than those heretofore conceived of, it has been found of prime importance to heat to a temperature where it will not be readily affected by water and have present in the earthy material only such ingredients as are not readily water-soluble.

A further improvement in the present product is the manner and extent of dispersion of the earthy material in the waterproof binder. Heretofore it has been thought sufficient to have the earthy constituents incorporated to the extent that there was no considerable balling of the discrete particles of earth. It has now been found to be decidedly advantageous and, in fact, essential to a proper mix and to procure the desired density in the compressed mass to have the finely pulverized earthy material dispersed and distributed through the asphalt to the extent that no localization or concentration of the earthy constituents can be detected with the unaided eye. This improvement is more than a matter of degree, as actual weathering conditions over a considerable period of time have proved that the existence of localized earth in the mass gives rise to the earliest disintegration of the surface.

I claim as my invention:—

1. A process for making a waterproof surfacing material, comprising the steps of heating an earthy material to a minimum temperature of 400° F., pulverizing said material to the extent that seventy percent more or less passes a two hundred mesh screen, and intimately incorporating therein a waterproof bituminous substance to produce a dense, homogenous mass.

2. A process for making a waterproof surfacing material, comprising the steps of heating an earthy material containing not more than one-half of one percent of water soluble material to a minimum temperature of 400° F., finely pulverizing said material to the extent that seventy percent more or less passes a two hundred mesh screen, and incorporating therein a waterproofing substance to produce a dense, homogenous mass.

3. A process for making a waterproof surfacing material, comprising the steps of heating an earthy material containing not more than one-half of one percent of water soluble material to a minimum temperature of 400° F., finely pulverizing said material to the extent that seventy percent more or less passes a two hundred mesh screen, and intimately incorporating therewith and dispersing therethrough a waterproofing bituminous substance to the extent that localization and concentration of the earthy material is not detectable with the unaided eye.

JAMES EDGAR BLACK.